(12) United States Patent
Krüger

(10) Patent No.: US 6,692,345 B1
(45) Date of Patent: Feb. 17, 2004

(54) LAYING-DOWN SYSTEM AND VISION-BASED AUTOMATIC PRIMAL CUTTING SYSTEM IN CONNECTION THEREWITH

(75) Inventor: Peter Krüger, Esbjerg (DK)

(73) Assignee: K. J. Maskinfabriken A/S, Esbjerg (DK)

(*) Notice: Subject to any disclaimer, the term of this patent is extended or adjusted under 35 U.S.C. 154(b) by 0 days.

(21) Appl. No.: 10/069,500
(22) PCT Filed: Aug. 28, 2000
(86) PCT No.: PCT/DK00/00475
§ 371 (c)(1), (2), (4) Date: Jul. 8, 2002
(87) PCT Pub. No.: WO01/15538
PCT Pub. Date: Mar. 8, 2001

(30) Foreign Application Priority Data

Aug. 27, 1999  (DK) .......................................... 1999 01199

(51) Int. Cl.⁷ .......................... A22B 7/00; A22C 21/00; A22C 25/08
(52) U.S. Cl. ................... 452/177; 452/183; 452/134
(58) Field of Search ................. 452/183, 177, 452/180, 134

(56) References Cited

U.S. PATENT DOCUMENTS 3,982,299 A * 9/1976 Kompan .................. 452/157
4,189,806 A * 2/1980 Van Heyningen ......... 452/134
4,979,269 A * 12/1990 Norrie .................... 452/134

FOREIGN PATENT DOCUMENTS

| DE | 41 09 345 A | 9/1991 |
| DE | 41 31 556 A | 4/1992 |
| DK | 161 656 B | 8/1991 |
| DK | 167 462 B | 11/1999 |
| EP | 0 594 528 A | 4/1994 |

* cited by examiner

Primary Examiner—Charles T. Jordan
Assistant Examiner—Judith A. Nelson
(74) Attorney, Agent, or Firm—Nixon Peabody LLP; David S. Safran

(57) ABSTRACT

In the primal cutting-up of half carcasses of animals (12), vision systems are known whereby the determination of one or more fix points on the carcasses takes place, and where on the basis of the position of these points a visualisation of the ideal cut line is effected. But the primal cutting-up of carcasses (12) has hitherto been carried out with manually-operated saws on the basis of operator evaluation. However, the use of manually-operated saws involves the possibility of deviations in relation to the ideal cut line, and the manual work is very monotonous and fatiguing for the operators.

Figure 1:
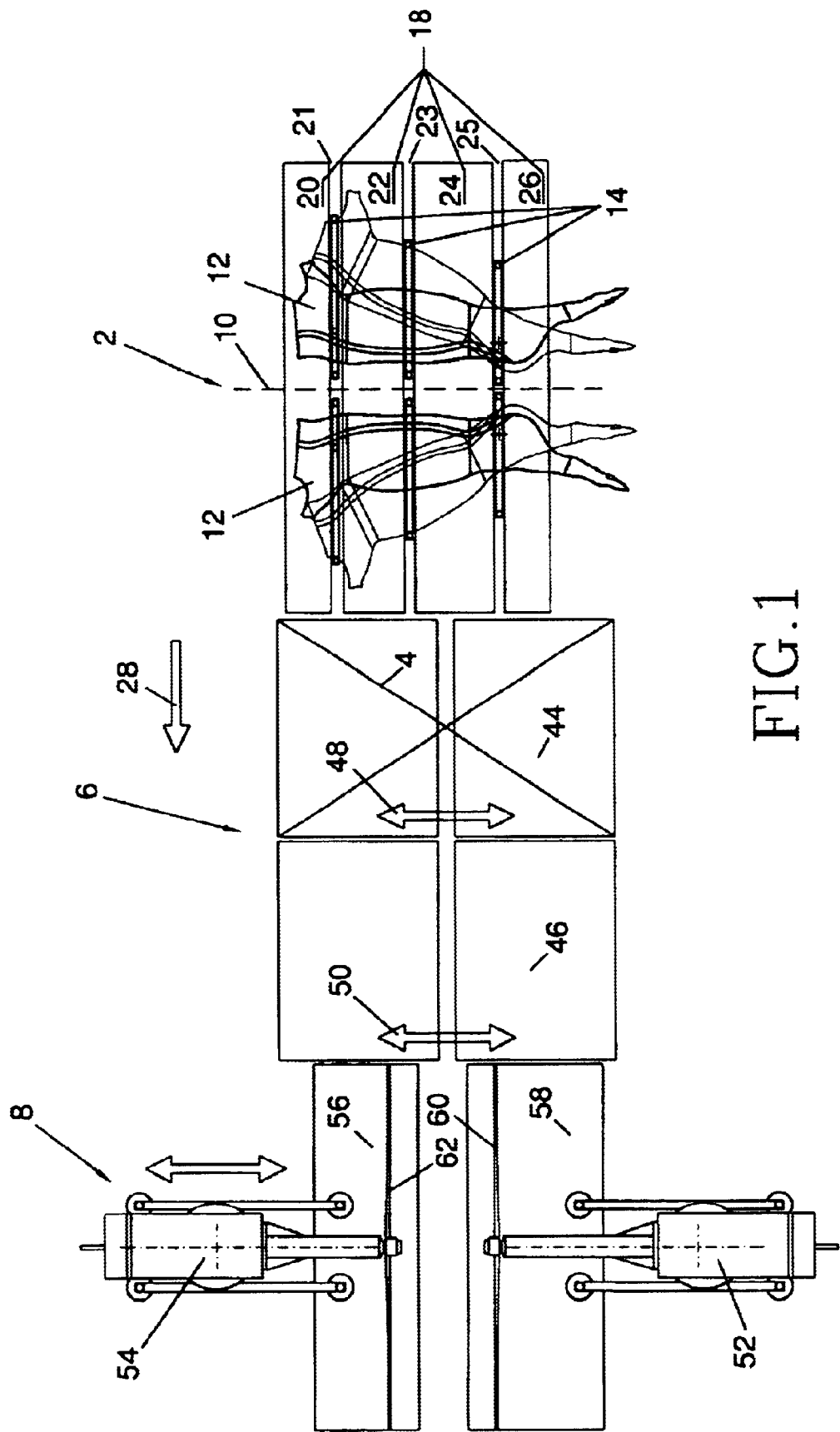

There is thus disclosed a laying-down module (2) and a vision-based system for automatic primal cutting-up of half carcasses, comprising a laying-down module with a laying-down conveyor (18), and a laying-down and angle-positioning module (6) with sideways displaceable conveyors for positioning of a relevant carcass (12) for sawing-up in a subsequent saw module (8), and a method for the execution of automatic primal cutting-up of meat items, namely half carcasses of animals.

18 Claims, 8 Drawing Sheets

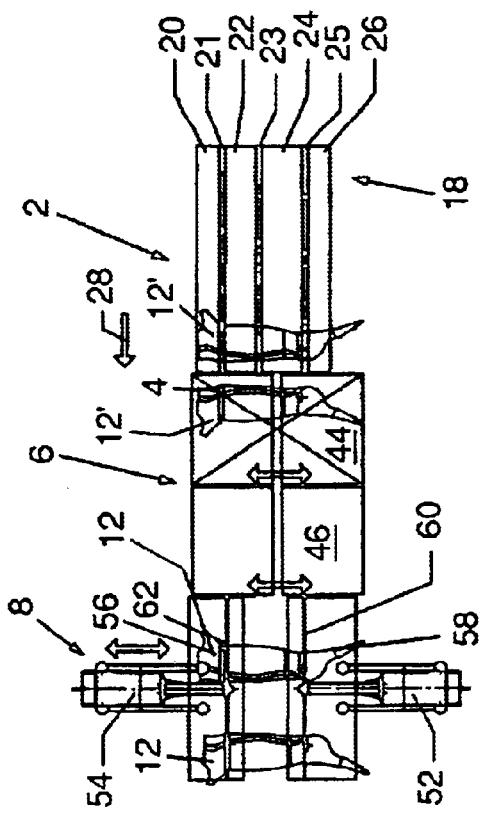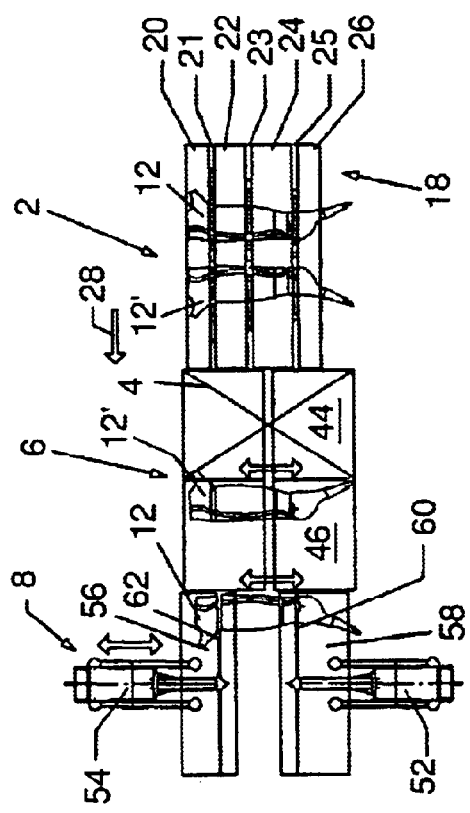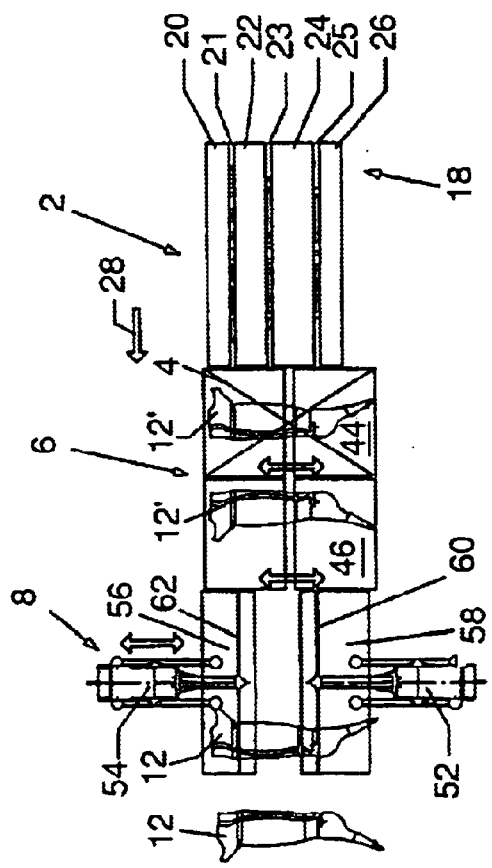

LAYING-DOWN SYSTEM AND VISION-BASED AUTOMATIC PRIMAL CUTTING SYSTEM IN CONNECTION THEREWITH

The present invention concerns a laying-down system for building together with a plant for the primal cutting-up of meat items, namely half carcasses of pigs. The invention also concerns a fully-automatic system for the primal cutting-up of meat items, namely half carcasses of pigs, and comprising a laying-down module, a vision-based detection system for the determination of relevant fix points on meat items, a calculation unit with interface for the controlling of a positioning module and a sawing module. Moreover, the invention concerns a method based on a vision system for primal cutting-up of meat items.

The dividing-up of half pig carcasses is traditionally carried out by an operator placed at a conveyor belt on which the carcasses pass, in that he manually corrects (pulls/pushes) the half carcass in position for a saw (circular knife) which is disposed above the conveyor belt. With this method, use is made of an operator and a saw for each cut which is made in the half carcasses.

The way in which the correction of the half carcasses is typically carried out is that a line laser marker mounted on the individual saws irradiates the conveyor band immediately in front of the saw in an imaginary line through the blade of the saw, and the operator uses this laser beam in moving the half carcass manually so that this is sawn through in the desired place.

The above-mentioned method has several disadvantages. In the first place, the operator's work is monotonous and physically demanding, and operators who carry out this work are worn-out by the work after a relatively short period. Secondly, the positioning of the cut is based on the subjective judgement of the individual operator, so that the accuracy can fall with changing operators, inattention on the part of the operator, or if he has difficulty in maintaining the necessary concentration over longer periods of time. Thirdly, the definition of the correct knife positioning can change during the course of the production, which necessitates verbal communication of the changed requirements out to a number of operators, which involves possibilities of error.

Efforts have been made to automate the above-mentioned method, for example in DK B 161 656 there is disclosed a semi-automatic plant of the kind whereby an operator moves a position-provider coupled to a laser beam to the positions on the half carcass where he judges that the cuts shall be placed. When the laser beam irradiates the place of the cut, the operator activates an operating element, whereby the position of the position-provider is read into a control system. The positions of the cutting places are used to position the half carcasses and the subsequent saws, so that the different cuts are effected in accordance with the judgement of the operator. The publication also discloses a method for arranging the individual half carcasses so that their lengthways axes are positioned at right-angles to the feeding direction. With the said system, it is thus possible for human errors of judgement to be made in connection with the positioning which determines the cuts which are to be carried out in the half carcasses.

In DK T3 0 594 528, a system is disclosed by which, with the help of mechanical measuring of the half carcasses, it can carry out a tripartition of these (ham and fore-end cuts). The arranging of the half carcasses to the correct angle takes place in connection with the measuring of fix points in the pig carcass, in that this is drawn over the surface of the conveyor by means of the mechanical measuring means.

The above-mentioned methods are based either on manual or mechanical localisation of the fix points which form the starting point for the cutting-up positions.

DK B1 167 462 discloses a vision system for the determination of said fix points on the half of an animal carcass, said vision system being coupled to a computer for the implementation of picture analysis which, after the determination of the position of fix points in a manner which is not specified, is said to send control signals to mechanisms which are not further described, and which on the basis of the positioning of the fix points carry out the arranging of the carcass and of the system's tools for the cutting-up of said carcass.

However, several different patents and patent applications are to be found which deal with actual vision analyses of meat products, partly with the view of classifying meat products, e.g. for determining the market value, and partly to be able to determine the position of certain structures. Among these there are two German publications, DE C2 41 31 556 and DE A1 41 09 345, to which reference is made when, in connection with the present invention application, vision analysis/determination of fix points on half carcasses is discussed. The precondition for the present invention is thus that the position of the fix points on half carcasses, which are used as starting point for the determination of the individual cuts, takes place by means of said vision system. The vision system comprises a video camera which takes a picture of the half carcass while this passes under the camera on a conveyor. The camera is coupled to a computer, which with specially-developed software recognises the contours and inner structure of the half carcass, such as e.g. vertebrae in the spine and the pubis. Hereafter, with great accuracy the computer calculates the positions of the individual fix points in relation to a given zero line. By means of the computer together with suitable interface and actuators, the positioning of the fix points in relation to the zero line can subsequently be used for effecting mutual positioning of the half carcasses/saws with starting point in a beforehand desired positioning of the cuts in relation to said positioning of said fix points. The positioning can take place either by effecting a displacement of the saws (saw blades) in the lateral direction, still with the blades arranged parallel with the transport direction, and/or by using conveyor plant which can be displaced in the transverse direction by means of actuators.

The above-mentioned method and system is particularly suitable for use when an ordinary "industrial cut" is to be made (double cut where the fore-end and hams are separated from the central piece) at right-angles to the length-ways direction of the carcass, where the half carcasses are transported with the lengthways direction arranged at right-angles to the direction of transport, and where the parting cuts are placed in relation to the positions of the fix points by positioning of the half carcasses on sideways-displaceable conveyors, and positioning of the saws in the sideways direction.

If only a ham cut is to be carried out, which is sometimes known as a "Belgian cut", also in the following, it will not be possible to use the above-mentioned method for automatic parting of the carcass, in that a Belgian cut is effected as an inclined cut in relation to the lengthways direction of the carcass, though still in relation to the positioning of the relevant fix point on the half carcass. When carrying out the parting with this type of cut, it has thus hitherto been necessary to effect the cutting manually with manually-operated saws with laser marking of the positioning of the cut, in that the cut which is carried out here shall extend at an angle in relation to the direction of transport. Neither is the above-mentioned method particularly suitable when it is preferred to carry out an optimised industrial cut, which often involves the placing of the cuts at an angle which deviates from right-angles to the lengthways direction of the carcass.

For solving the above-mentioned problems in connection with the placing of the meat items, there is thus disclosed a laying-down module of the kind which is disclosed and characterised in claim 1.

With the U-shaped laying-down fixtures, it is hereby achieved that the meat item/half carcass, after receipt by being successively fed forwards by the suspension conveyor, is placed in the low points of the fixtures, so that before the laying-down on the laying-down conveyor, these are arranged so that the half carcass in the under-supporting points defined by the low points of the two outermost fixtures is lying in a line which is arranged substantially at right-angles to the transport direction of the laying-down conveyor. There is hereby achieved a very uniform positioning and orientation of the transported carcasses, which by the vertical downwards-directed displacement of the fixtures subsequently places the half carcasses in this position on the laying-down conveyor for transport in the further cutting-up process. Moreover, it will not always be certain that the low point in the centremost fixture lies on the line which can be drawn between the two outermost fixtures.

Moreover, with this construction of the laying-down module, it will be possible to place the two outermost fixtures in a manner in which they are displaced from each other, so that the line between the low points of these fixtures deviates from right-angles to the transport direction of the laying-down conveyor. With this embodiment, the changing of this angle can take place only by constructional intervention, which hardly satisfies the demands concerning flexibility which are placed in connection with the primal cutting-up of meat items, namely in the carrying out of optimised industrial primal cutting up.

The subsequent sub-claims 2–7 disclose how said demands for flexibility can be increased.

Claim 2 thus discloses adjustment means for fine adjustment of the fixtures by relative horizontal displacement along with the spacing between the belt of the laying-down conveyor. In practice, this possibility of fine adjustment will be sufficient in connection with the carrying out of optimised industrial cuts, where most often there is a need only to achieve smaller relative displacements between the low points of the two outermost fixtures in order for the line between these to form an angle which deviates from right-angles to the transport direction of the laying-down conveyor.

On the other hand, if a subsequent ham cut ("Belgian cut") is to be made, it will be necessary to place the fixtures, possibly with the adjustment means disclosed in claim 2, on the angling-out mechanism disclosed in claim 3, whereby the laying-down fixtures are relatively displaced by an actual movement each time a meat item is received from the suspension conveyor, so that the low points of the two outermost fixtures are lying on a line which forms a predetermined angle in relation to the transport direction, so that the carcasses in this position are placed on the laying-down conveyor at an inclined angle, and in this position are transported further by the laying-down conveyor to subsequent steps in the process.

Furthermore, as disclosed in claim 4, the adjustment means can be provided with actuators, so that during operation of the laying-down module, adjustments of the angling-out of the meat items can be carried out before these are laid down on the laying-down conveyor for further transport to subsequent steps in the process.

It will be obvious that the laying-down module will be able to be arranged for receiving half carcasses for primal cutting-up which are transported successively in pairs on the suspension conveyor. A laying-down module arranged for this purpose is disclosed in claim 5, where the related carcasses are angled-out in a laterally reversed manner, but with the same degree of angling-out.

With the view to achieving a further optimisation of the subsequent primal parting process, it can also be advantageous to be able to carry out an adjustment of the angling-out in relation to a fix-point determination such as disclosed in claim 6.

With the view to achieving a well-defined and uniform positioning of the lengthways axes of the half carcasses when these are received, the U-shaped hoop fixtures can be configured as disclosed in claim 7. It is hereby achieved that the half carcasses which are thrown off from the conveyor slide down in the correct position for angle positioning.

A system for the primal parting of meat items, i.e. half carcasses of pigs, and comprising a laying-down module, a vision detection system for the determination of relevant fix points on meat items, a calculation unit with interface for the controlling of a positioning module, and a saw module, is disclosed in claim 8, and can be provided with a laying-down module disclosed in any of the claims 1–7, and which also has the characteristics disclosed in points b and c in claim 8.

The advantages of the system according to claim 8 should be obvious, i.e. providing this includes a laying-down module with all of the characteristics disclosed in claims 1–7, in that there is hereby achieved a fully-automatic system for primal parting of meat items, which practically speaking enables automatically-implemented parting of meat items in accordance with any desired cut positioning, and which also allows continuous optimisation of the cut positioning, not only in relation to average considerations concerning the determination of fix points on a series of transported meat items/carcasses, but optimisation in relation to fix-point determinations carried out on each individual meat item, and subsequent placing of the ideal cut line on the basis of empirical ideal cut lines for a meat item with size and fix-point placing determined by the vision detection system.

A more simple system for primal parting of the disclosed kind can, however, be arranged as disclosed in claim 9.

In claim 10 there is disclosed a method based on a vision detection system for primal parting of meat items, i.e. half carcasses of pigs. The method according to the invention is based on the use of the above-mentioned known vision system for detection of the fix points which form the basis for the positioning of the parting cuts, no matter whether these are standard industrial cuts or ham cuts ("Belgian cuts"), or other special cuts such as optimised industrial cuts used in the primal cutting-up, so that manual handling in the cutting-up process is avoided, and also so that human errors in connection with the placing of the cuts are eliminated. In this connection it should be mentioned that the angles $V_1$ and $V_2$ can assume the value zero (typically with industrial parting cuts).

With the invention, use is thus made of the fact that the calculation of the positioning of the fix point in relation to the zero line can be carried out no matter whether the half carcasses arrive at the picture-taking section with the lengthways direction arranged at right-angles to the transport direction, or at an angle which deviates from right-angles.

Whether the half carcasses arrive at the picture-taking section with lengthways direction at right-angles to the direction of transport, or at an angle which deviates from this, is thus determined on the basis of how the primal cutting-up of the half carcasses is to be carried out by the saw module, the blades of which are oriented parallel with the transport direction. If, for example, a traditional industrial cut is to be effected, where the half carcass is divided with a fore-end cut and/or a rear-end cut, it is normally preferred that the half carcass is conveyed into the cutting plant (and herewith to the picture-taking section) with the lengthways direction arranged at right-angles to the transport direction, after which said cut is effected in relation to the pubis and especially the armpit, typically so that upon passage of the positioning module, the half carcass is positioned in relation to the cutting line of the ham saw, with starting point in the positioning of the pubis, and the cut line of the saw system's fore-end saw is lined up in relation to the position of the armpit.

If a "Belgian cut" (ham cut) is to be effected, it is preferred that the half carcass be conveyed into the cutting plant (and herewith to the picture-taking section) with lengthways direction oriented at an inclined angle in relation to the transport direction, after which the cut is effected solely in relation to the position of the pubis, which is made possible by the laying-down module according to the invention.

With the combination between the use of a vision-controlled positioning and cutting-up system and the laying-down module according to the invention, with the invention there is achieved a fully-automatic and very precise cutting-up of half carcasses which shall be parted with Belgian cuts (ham cuts) and optimised industrial cuts, in that the half carcasses are laid down on the laying-down conveyor with the lengthways direction of the carcass at a pre-selected angle in relation to the transport direction, corresponding to the preferred angle with which the cutting-up with Belgian cuts, or optimised industrial cuts, is carried out with a cutting system which has saw blades arranged parallel with the transport direction.

Figure 2:
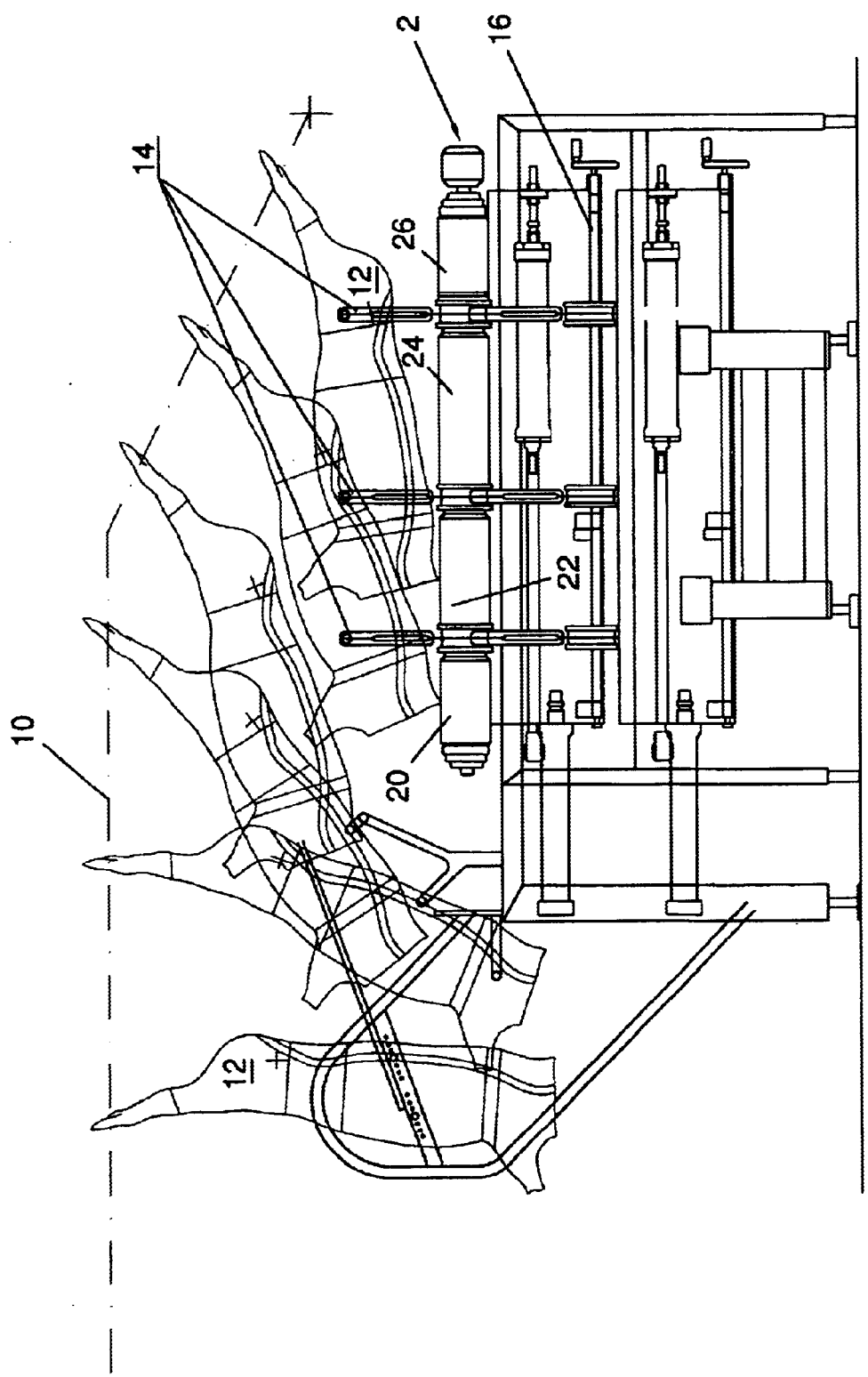
Figure 3A:
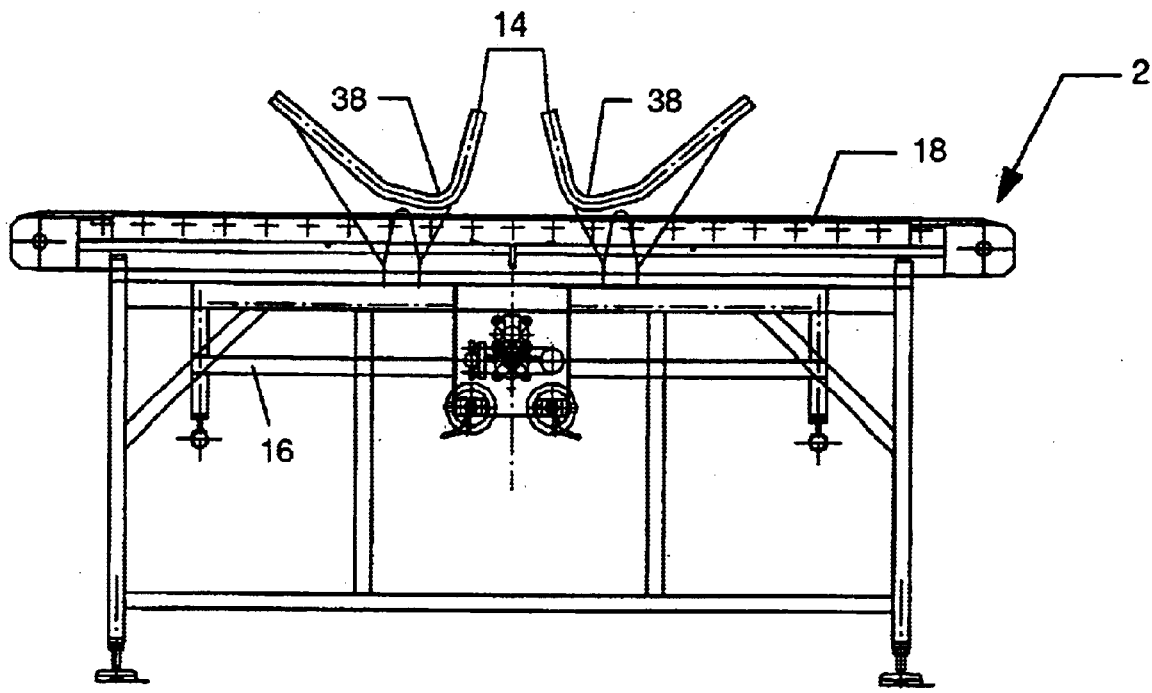
Figure 3B:
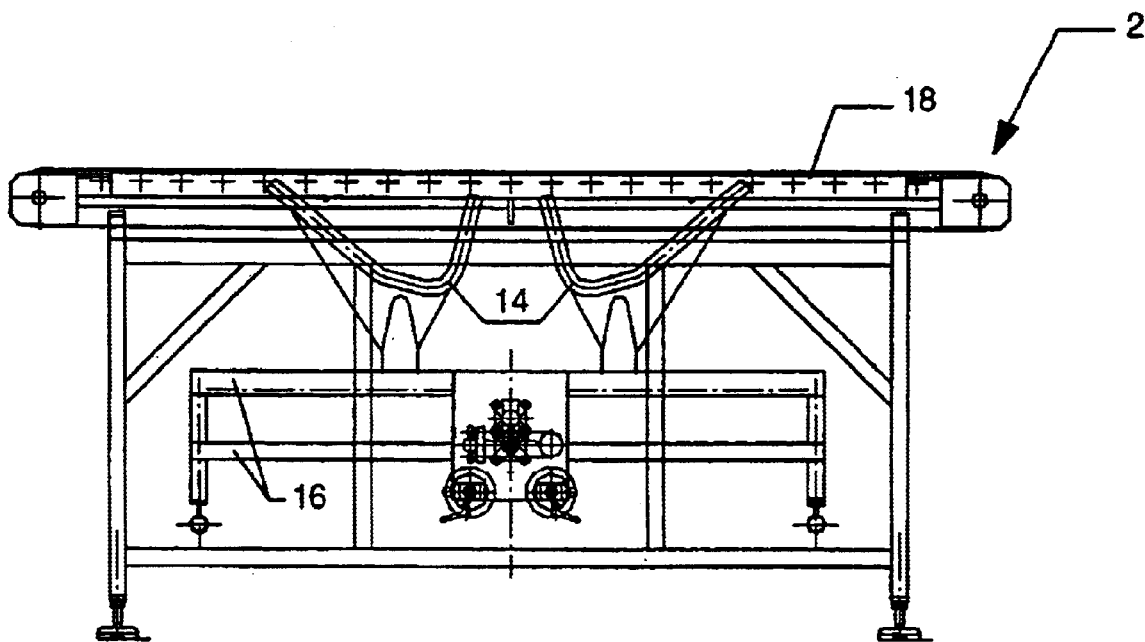
Figure 4:
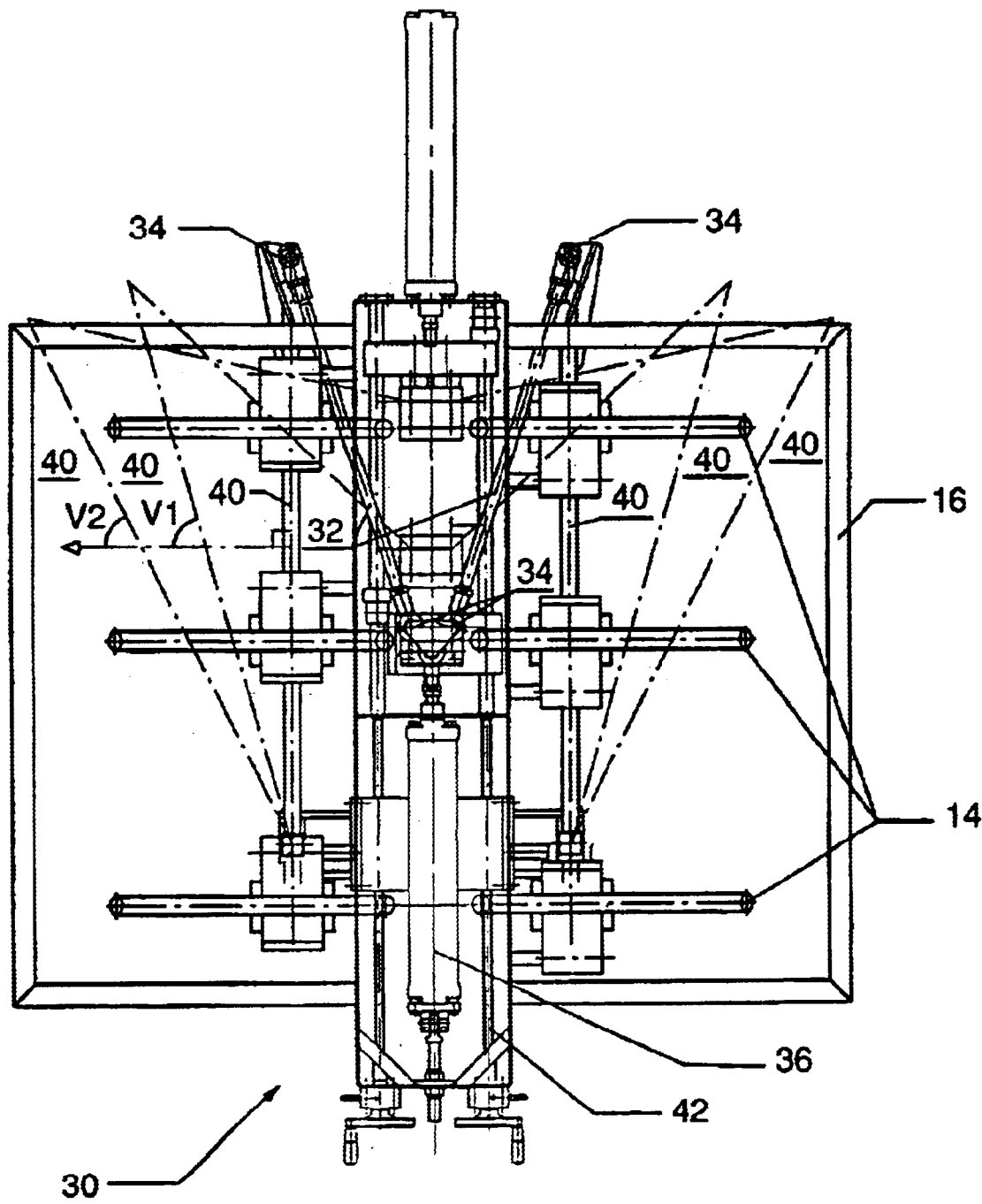

In the following, the invention is explained in more detail with reference to the drawing, where FIG. 1 is a schematic plan view of a fully-automatic vision-controlled cutting-up system with laying-down modules according to the invention, and comprising an angle-positioning system, FIG. 2 is a detail view of the procedure of laying-down half carcasses in the laying-down module, FIGS. 3a and 3b are detail side views of the laying-down module according to the invention, FIG. 4 is a plan view of FIG. 5 showing the angling-out mechanism, FIG. 5 is a schematic plan view of the system shown in FIG. 1 in the carrying out of Belgian cuts, and FIG. 6 is the same as FIG. 5, but where industrial cuts are carried out.

FIG. 1 shows a schematic view of an embodiment of a fully-automatic cutting-up system for primal parting of half carcasses of pigs. The system is intended for adjustment for carrying out practically all types of known, desired primal parting cuts.

In the embodiment shown, the cutting-up system comprises a laying-down module 2, a vision system 4 (with associated calculation unit and interface for actuators which are not shown in detail, in that this is considered to be known technique), placed over a positioning module 6, and a saw module 8. Above the laying-down module 2, there extends a laying-down conveyor 10 (cf. FIG. 2) for the successive delivery of related half carcasses 12 to the laying-down module 2.

As indicated in FIG. 1, and as shown clearly in FIGS. 2, 3A, 3B and 4, the laying-down module 2 comprises a set of substantially U-shaped laying-down fixtures 14 which are laterally reversed in relation to each other. As will appear from FIGS. 3A and 3B, the fixtures 14 are suspended on a vertically-displaceable base frame 16 between two outer positions, where the upper sides of the fixtures are lying at a level above the laying-down module's conveyor 18, and respectively where the uppermost parts of the fixtures 14 are lying at a level below the surface of the conveyor belt.

As will appear from FIG. 1, the conveyor 18 is divided into four tracks/belts 20, 22, 24, 26, which are mutually spaced apart by the spaces 21, 23, 25. The breadth of the tracks/belts is determined respectively by a preferred total belt breadth of the conveyor 18, and by the distance between the individual hoops in the fixtures 14. The individual belts are moved in a synchronous manner in the transport direction of the conveyor. The transport direction of the conveyor and the transport direction of the whole of the cutting-up system is indicated by the arrow 28 in FIG. 1.

The fixtures 14 are also connected to an angling-out mechanism 30 cf. FIG. 4 mounted on a base frame 16. The angling-out mechanism is connected with the fixtures 14 via rod connections 32 with pivot link 34, which in turn stand in connection with an actuator in the form of a displaceable piston 36, the displacement of which causes a mutually reversed displacement in the lateral direction of the anchoring points for the U-shaped fixtures, so that the line 40 which is described by the low points 38 of the U-shaped fixtures 14 is displaced from a direction at right-angles to the transport direction 28 of the conveyor, so that this line forms an angle $V_1$ or $V_2$ which deviates from right-angles. The angling-out mechanism also comprises adjustment mechanisms 42 for fine adjustment of the angular displacement.

It should be noted that the angling-out mechanism 30 can be completely omitted, providing that the system is intended for use only for the carrying out of industrial parting cuts or optimised industrial cuts, where the meat items /carcasses 12 are laid down on the conveyor 18 in a position where the low points 38 of the outermost U-shaped hoops in the laying-down fixtures 14 are lying on a line at right-angles to the transport direction 28 of the conveyor, possibly with a small angular deviation adjusted by means of the adjustment mechanism 42, for carrying out an optimised industrial cut. If it is desired to effect industrial parting cuts only, the adjustment mechanism 42 can also be omitted.

In FIG. 2 it is shown how the half carcasses 12 are laid down on the laying-down module 2 from a laying-down conveyor 10. The half carcasses 12 are laid down on the raised fixtures 14 which are disposed in the receiving position above the belts 20, 22, 24, 26 of the conveyor. The half carcasses 12 are hooked off the conveyor 10, which is determined by the length of the half carcasses. Moreover, the half carcasses are transported in pairs to and subsequently laid down in the fixtures 14.

The positioning module 6 comprises two conveyors 44, 46 placed in extension of each other, where above the conveyor 44 closest to the laying-down module 2 there is placed a vision camera 4. By means of a known technique, the conveyors 44, 46 are displaceable in the sideways direction by not-shown actuators, as indicated by the arrows 48, 50. The actuators for the sideways displacement of the conveyors 44, 46 are controlled by a computer (not shown).

The saw module 8 comprises a ham saw 52 and a side-ways-displaceable fore-end saw 54. The saw blades are oriented parallel with the transport direction 28 in the cutting plant, and have an extent so that the edges extend a distance down below the surface of the conveyor belt 56, 58 of the saw module.

The fully-automatic primal cutting-up system's laying-down module 2, positioning system 6, vision system 4 and saw module 8, are all connected to a computer (not shown) which, on the basis of the vision system's picture analysis, calculates the actual positioning of the fix points for the positioning of the parting cuts for the desired cutting-up, in relation to a zero line. Hereafter, the half carcasses 12 are moved in by sideways displacement of the positioning conveyor's belts 44, 46, preferably so that the placing of the ham cut, which is determined by the position of the pubis, is positioned in relation to the saw-blade line 60 for the ham saw 52, after which the fore-end saw is displaced in the sideways direction in relation to the desired placing of the fore-end parting cut, which is typically determined on the basis of the position of the ulna. Hereafter, the half carcasses are transferred through the saw module during the carrying out of the parting cuts.

In connection with fully-automatic parting with "Belgian cuts", which comprises only a single inclined ham cut in between the groin of the carcass and across the carcass towards the ham, it will be necessary to use the angling-out mechanism 30, so that the lengthways direction of the carcass is arranged at an angle $V_2$ in relation to the direction of transport through the saw line 60 for the ham saw 52 of the saw module.

However, a certain angling-out of the half carcasses 12 is also required, though less than the angling-out with the "Belgian cut", when carrying out a traditional industrial parting cut, which comprises two cuts, i.e. the ham cut and the fore-end cut along the saw lines 60, 62. The changeover for this purpose can quickly be carried out by means of the angle adjustment mechanism 42.

Figure 5B:
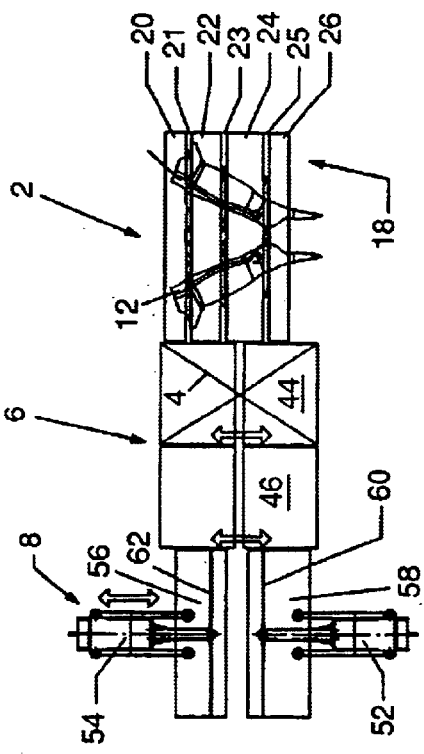
Figure 5A:
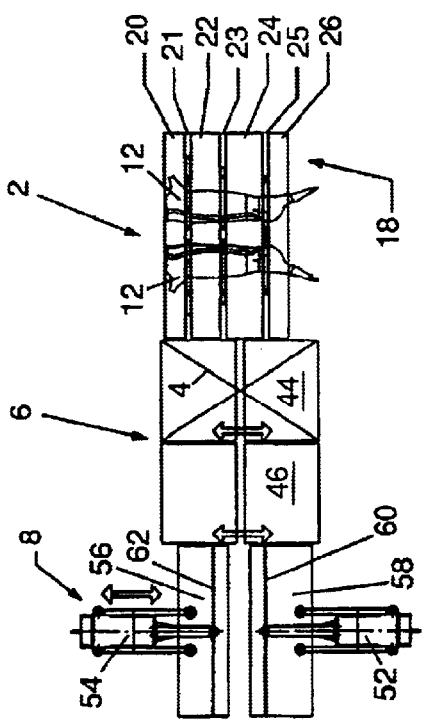
Figure 5D:
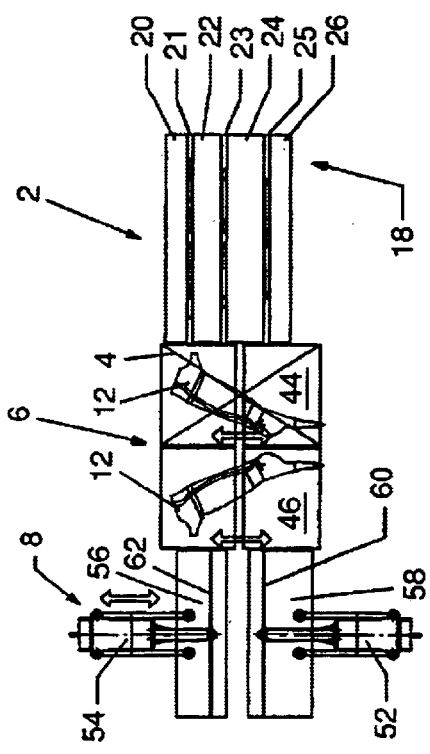
Figure 5C:
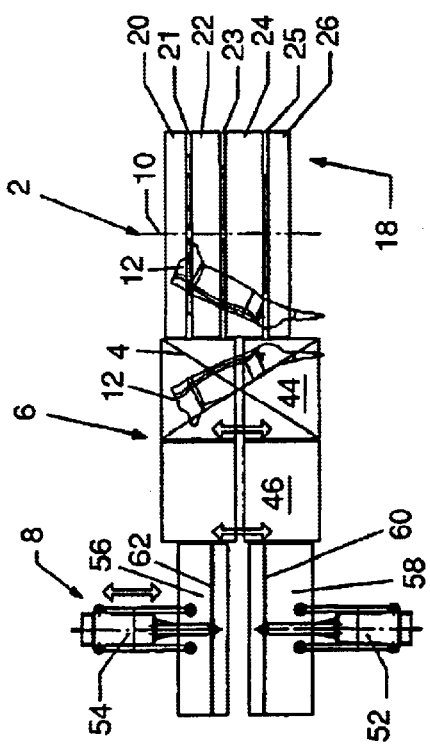
Figure 5E:
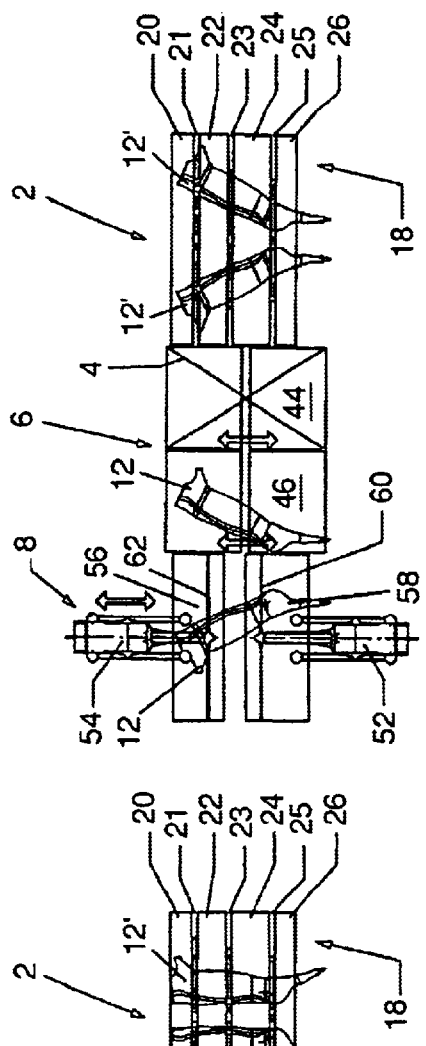
Figure 5F:
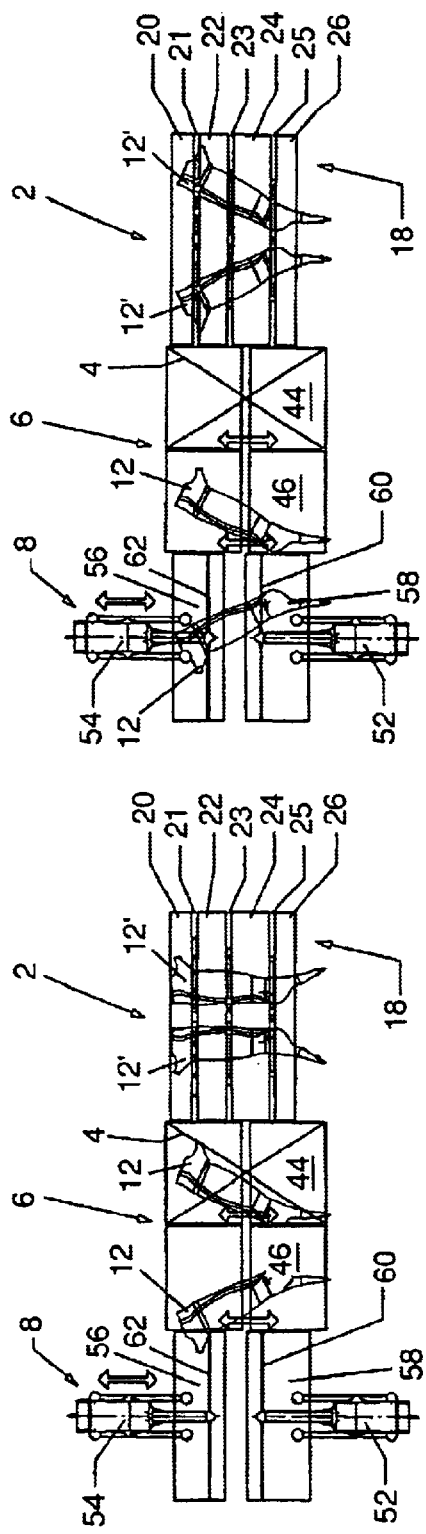
Figure 5G:
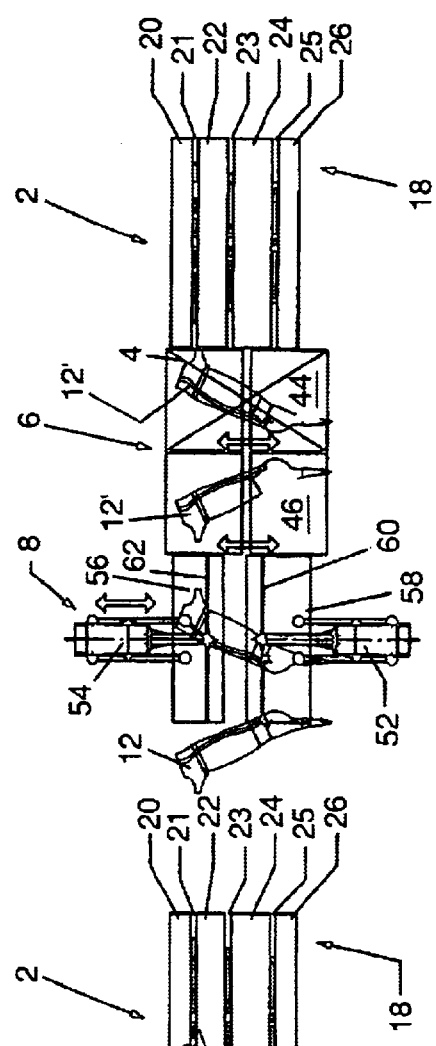
Figure 5H:
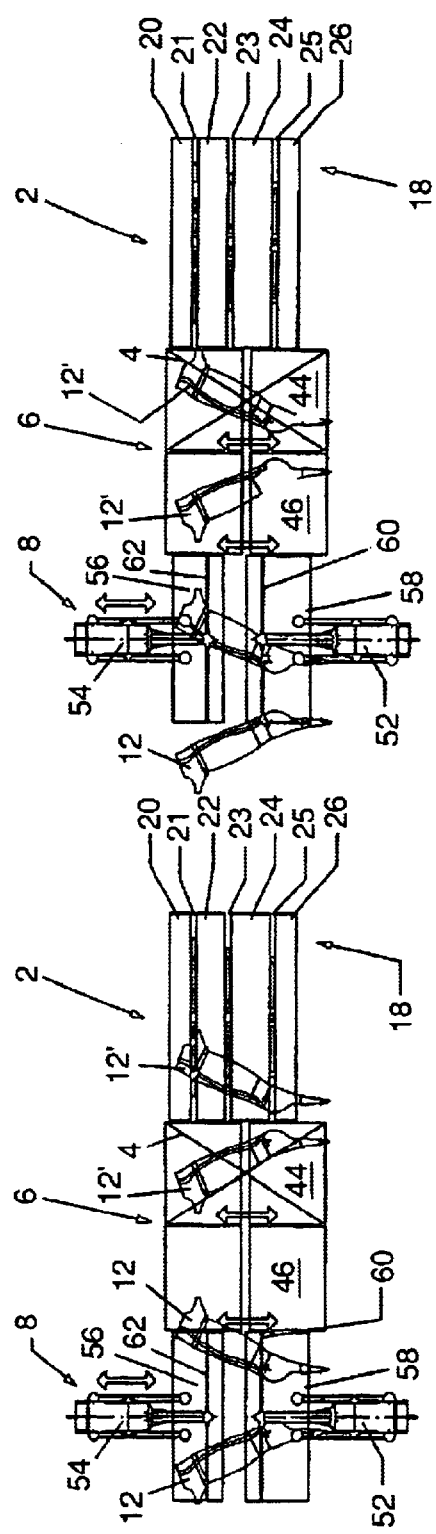

In FIG. 5A to 5H it is shown how the parting of half carcasses 12 with the "Belgian cut" is carried out with a fully-automatic cutting system. In FIG. 5A, a first pair of half carcasses 12 arrive at the laying-down module 2 in the fixtures 14 (not shown for the sake of clarity), after which an angling-out (FIG. 5B) is carried out by the angling-out mechanism 30 (FIG. 4) and a subsequent lowering of the fixtures 14 (cf. FIG. 3B). The first of the two half carcasses 12 is fed in the transport direction 28 on to the positioning conveyor 44 (FIG. 5C), where the vision system 4 takes a picture of the half carcass, and this is sent to a picture analysis unit (not shown) which determines relevant fix points on the carcass for the positioning of the parting cuts, after which (FIG. 5D) the half carcass 12 is transferred to the positioning conveyor 46 where a positioning of the carcass 12 is carried out in relation to the saw line 60 for the ham saw 52. At the same time, the second half carcass 12 is fed in under the vision system 4 for the taking of a picture. Hereafter, the foremost positioned half carcass 12 is fed (FIG. 5E) forwards towards the saw module's saw 52, and the next pair of half carcasses 12' are received in the laying-down module 2, and the sawing of the foremost half carcass is started (FIG. 5F) at the same time that the positioning of the second half carcass is effected by the sideways displaceable conveyor 46 in the positioning module 6, and the next pair of half carcasses 12' are angled-out in the laying-down module 2. After positioning of the second half carcass 12, this is fed into the saw module 8 (FIG. 5C) where sawing-up is commenced along the line 60. At the same time, the foremost half carcass 12' of the next pair of half carcasses is fed to the vision system 4 on the conveyor 44 for the taking of a picture. With the sawing of the rearmost half carcass 12 (FIG. 5H) of the first pair of half carcasses 12, the foremost half carcass 12' of the second pair of half carcasses 12' is positioned by the sideways displaceable conveyor 46 at the same time that the second half carcass is photographed by the vision system on the conveyor 44. Hereafter, the procedures as described above are repeated.

Figure 6B:
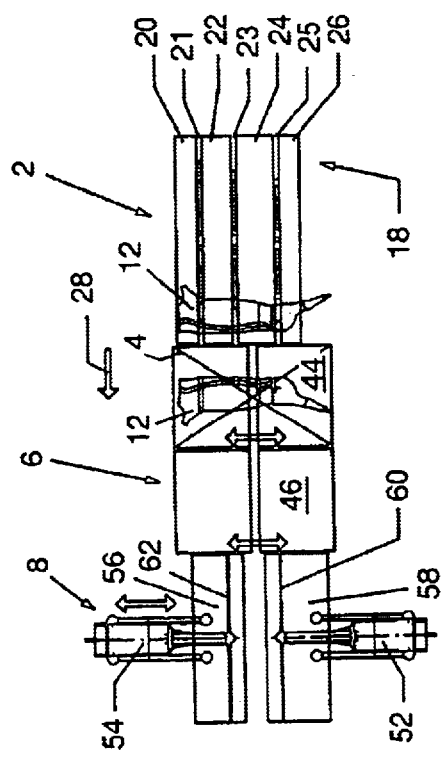
Figure 6A:
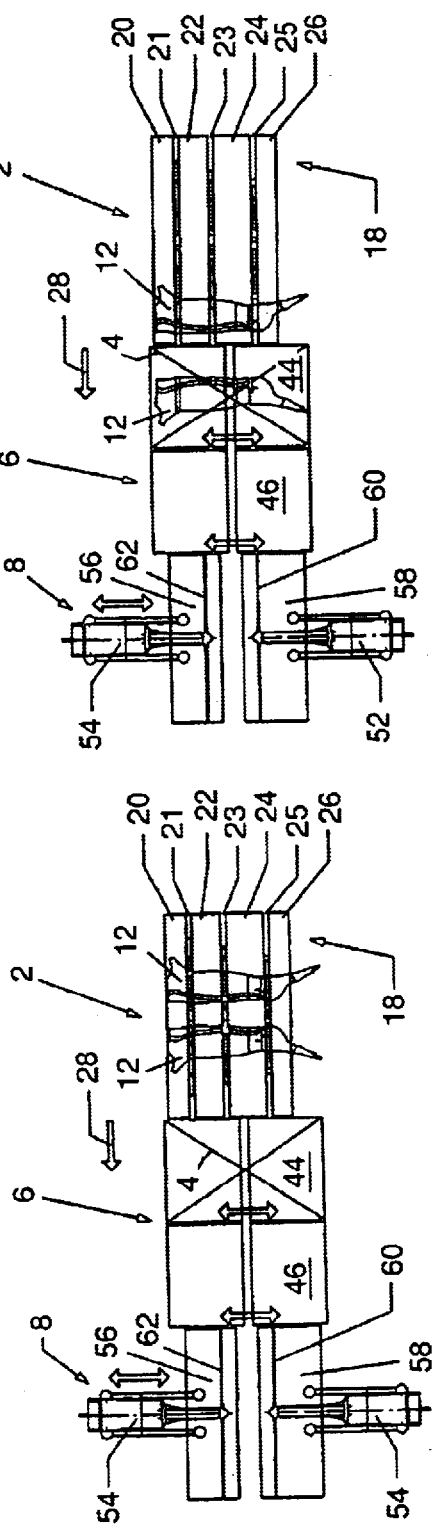
Figure 6D:
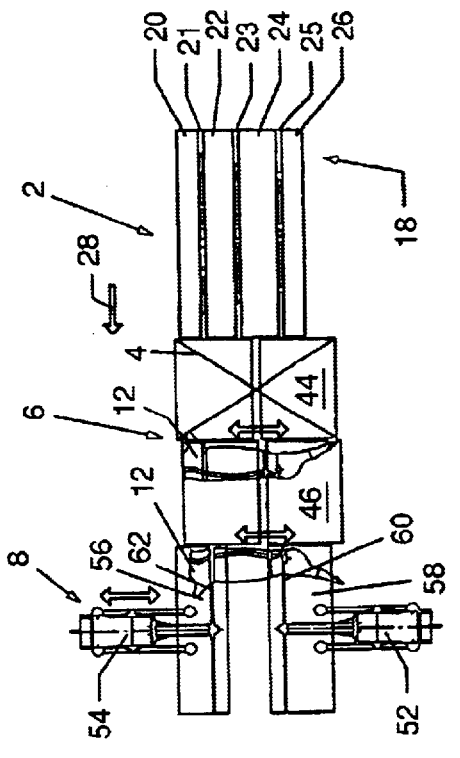
Figure 6C:
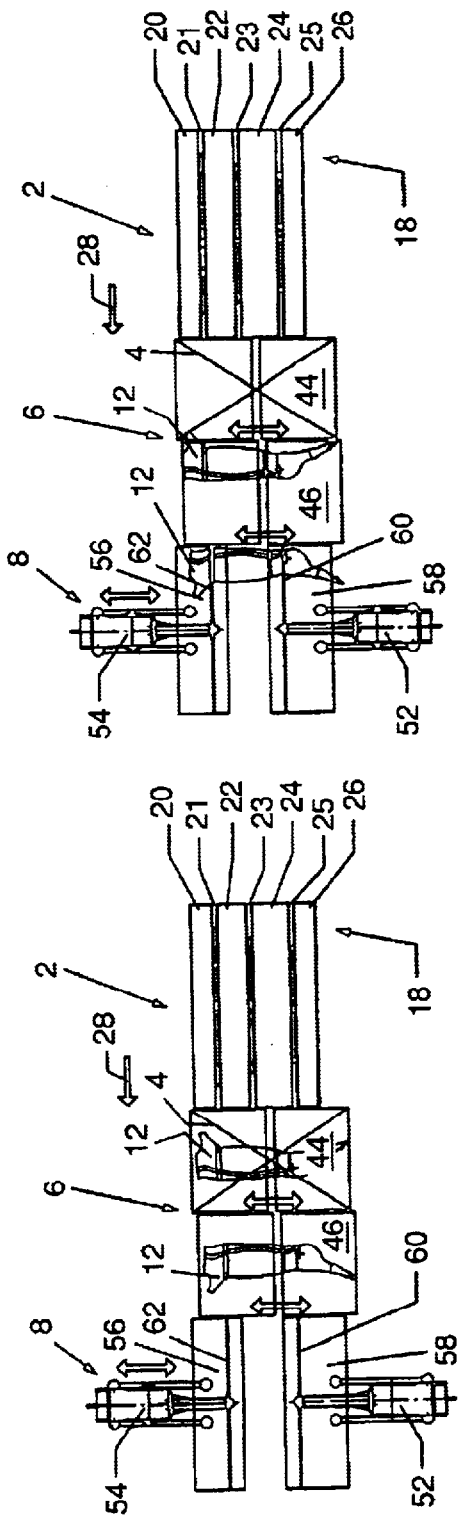

FIGS. 6A–6G show fully-automatic cutting-up when carrying out a traditional industrial cut, without angle positioning at the laying-down module 2, but where in the same manner as described above there is carried out a fix-point determination by the vision system 4 (FIG. 6B), a subsequent positioning in the sideways direction (FIG. 6C) for the cut line 60 for the ham saw 52, and a simultaneous positioning of the fore-end saw 54, followed by the feeding of the foremost half carcass 12 to the saw module 8 (FIG. 6D, positioning of the second half carcass 12 (FIG. 6E), and at the same time as the arrival of the next pair of half carcasses 12" in the laying-down module 2. The only difference in the implementation of the sequences for the industrial cut is that here there is also carried out a positioning of the cut line 62 for the fore-end saw 54 on the basis of a further fix point determined by the vision system, and that as opposed to the implementation of the ham cut, use is made of the fore-end saw.

There is thus disclosed a fully-automatic primal cutting system for carrying out "Belgian cuts" and ordinary industrial cuts, possibly effected in an angle-positioned implementation as a so-called optimised industrial cut.

In conclusion, it should be noted that the different configurations of the laying-down module 2, as disclosed in the claims, have the result that the fully-automatic primal cutting system according to the invention comprising the laying-down module 2, can assume embodiments in a corresponding manner. All depending on desires and requirements with regard to the positioning and optimisation of the positioning of the parting cut, the primal cutting system can thus be arranged within the scope of the patent claims.

What is claimed is:

1. Laying-down module for a system for primal cutting-up of meat items, comprising:
   a laying-down conveyor with spaced, synchronously-driven tracks,
   an angle-positioning module connected to the laying-down conveyor, and
   at least one set of substantially U-shaped laying-down fixtures in spaces between the tracks of the laying-down conveyor, lowest points on at least two outermost of said fixtures lying on a line oriented substantially at right-angles to a transport direction of the laying-down conveyor, and said laying-down fixtures being housed on a base frame which is vertically displaceable between a first outer position where the laying-down fixtures are located above the laying-down conveyor and a second outer position where the laying-down fixtures are located below surfaces of the tracks of the laying-down conveyor.

2. Laying-down module according to claim 1, wherein the U-shaped laying-down fixtures are provided with adjustment means for carrying out a relatively horizontal displacement of the substantially U-shaped laying-down fixtures in the spaces between the tracks of the laying-down conveyor, so that the line between the lowest points of the laying-down fixtures and the transport direction of the laying-down conveyor forms an angle which can deviate from right-angles relative to the transport direction of the laying-down conveyor.

3. Laying-down module according to claim 2, wherein the base frame further comprises an angling-out mechanism driven by a drive mechanism, by means of which the laying-down fixtures are horizontally displaceable between an angled-out position where lowest points of the laying-down fixtures are on a line at a right-angle to the transport direction of the laying-down conveyor, and an angled-out position where said line forms another, pre-selected angle in relation to the transport direction; and wherein the adjustment means is housed on the angling-out mechanism.

4. Laying-down module according to claim 3, wherein the adjustment means are provided with actuators for automatic adjustment of the angle of said line relative to the transport direction.

5. Laying-down module according to claim 4, further comprising a suspension conveyor for successively feeding meat items in pairs to the laying-down and angle positioning module, wherein the angle-positioning module comprises two sets of substantially U-shaped laying-down fixtures in the spaces between the tracks of the laying-down conveyor, and where adjustment of said angle by the adjustment means and the angled-out position by the angling-out mechanism, respectively, is such that the line between the lowest points of the laying-down fixtures and the transport direction of the laying-down conveyor forms an angle which can deviate from right-angles relative to the transport direction of the laying-down conveyor in either of laterally reversed directions.

6. Laying-down module according to claim 5, wherein the laying-down module is adapted to perform a continuous adjustment of the angled-out position in accordance with varying sizes of the conveyed meat items; wherein the actuators of the adjustment means and the angling-out mechanism, respectively, are connected to a computer control unit which receives parameters concerning position of fixed points on the meat items from a vision detection system, said computer control being provided with software which is adapted to make adjustments based of optimising calculations for producing the most optimal cut.

7. Laying-down module according to claim 1, wherein the U-shaped fixtures have a configuration such that they extend in an asymmetrical manner, sloping towards a well-defined low point.

8. System for primal cutting-up of meat items, comprising a laying-down module, a vision detection system for the determination of relevant fix points on meat items, a calculation unit with an interface for the controlling of a positioning module and a saw module, wherein:
  a) the laying-down module comprises a conveyor with plane tracks,
  b) the positioning module comprises at least one sideways displaceable conveyor, above which there is a vision camera which is connected with a computer with vision detection software, which together constitute a vision detection system for the determination of fix points on the meat items, fed from the laying-down conveyor, in relation to a zero line, and
  c) interface is provided between said computer and actuators for sideways displacement of at least one of the at least one conveyor of the positioning module and saws in the saw module for the adjusting the relative position of the saws with respect to the fix points on the meat items.

9. System according to claim 8, further comprising an angle-positioning module connected to the laying-down conveyor, and
  at least one set of substantially U-shaped laying-down fixtures in spaces between the tracks of the laying-down conveyor, lowest points of on at least two outermost of said fixtures lying on a line oriented substantially at right-angles to a transport direction of the laying-down conveyor, and said laying-down fixtures being housed on a base frame which is vertically displaceable between a first outer position where the laying-down fixtures are located above the laying-down conveyor and a second outer position where the laying-down fixtures are located below surfaces of the tracks of the laying-down conveyor.

10. System according to claim 9, wherein the U-shaped laying-down fixtures are provided with adjustment means for carrying out a relatively horizontal displacement of the substantially U-shaped laying-down fixtures in the spaces between the tracks of the laying-down conveyor, so that the line between the lowest points of the laying-down fixtures and the transport direction of the laying-down conveyor forms an angle which can deviate from right-angles relative to the transport direction of the laying-down conveyor.

11. System according to claim 2, wherein the base frame further comprises an angling-out mechanism driven by a drive mechanism, by means of which the laying-down fixtures are horizontally displaceable between an angled-out position where lowest points of the laying-down fixtures are on a line at a right-angle to the transport direction of the laying-down conveyor, and an angled-out position where said line forms another, pre-selected angle in relation to the transport direction; and wherein the adjustment means is housed on the angling-out mechanism.

12. Laying-down module according to claim 11, wherein the adjustment means are provided with actuators for automatic adjustment of the angle of said line relative to the transport direction.

13. System according to claim 12, further comprising a suspension conveyor for successively feeding meat items in pairs to the laying-down and angle positioning module, wherein the angle-positioning module comprises two sets of substantially U-shaped laying-down fixtures in the spaces between the tracks of the laying-down conveyor, and where adjustment of said angle by the adjustment means and the angled-out position by the angling-out mechanism, respectively, is such that the line between the lowest points of the laying-down fixtures and the transport direction of the laying-down conveyor forms an angle which can deviate from right-angles relative to the transport direction of the laying-down conveyor in either of laterally reversed directions.

14. Laying-down module according to claim 13, wherein the laying-down module is adapted to perform a continuous adjustment of the angled-out position in accordance with varying sizes of the conveyed meat items; wherein the actuators of the adjustment means and the angling-out mechanism, respectively, are connected to a computer control unit which receives parameters concerning position of fixed points on the meat items from a vision detection system, said computer control being provided with software which is adapted to make adjustments based of optimising calculations for producing the most optimal cut.

15. Laying-down module according to claim 9, wherein the U-shaped fixtures have a configuration such that they extend in an asymmetrical manner, sloping towards a well-defined low point.

16. Method, based on a vision detection system for primal cutting-up of meat items comprising the following steps:
  a) the receiving of meat items fed successively onto a laying-down and angle positioning module by a suspension conveyor with lengthways axes of the meat items oriented substantially at right-angles to a transport direction of a laying-down conveyor, b) the positioning of the meat items at the laying-down and angle positioning module meat items positioned with the lengthways axes at a preferred angle in relation to a right-angle with respect to the transport direction of the laying-down conveyor, c) feeding the meat items on the laying-down conveyor in the transport direction forward to a positioning module comprising at least one sideways displaceable positioning conveyor, d) taking pictures of the meat items with the vision system brought to the positioning conveyor for the determination of fixed points thereon, e) positioning of the meat items at the positioning conveyor in relation to a zero line, on the basis of the fixed points determined by the vision system, f) positioning of a saw in a saw module in relation to the positioning of the fixed points, g) feeding of the meat items to a conveyor at the saw module, and h) the parting of the meat items by cutting-up with the saw during transport of the meat items by the conveyor of the saw module.

17. Method according to claim 16, wherein the meat items are transported successively in pairs on the suspension conveyor to the laying-down and angle positioning module, and wherein the taking of pictures by the vision system for determination of the fixed points are taken of at least a first of the two meat items of the pairs.

18. Method according to claim 16, wherein the meat items are half carcasses.

* * * * *